July 10, 1945.  B. A. SWANSON  2,379,938
FLUID POWER TRANSMISSION MECHANISM
Filed Dec. 19, 1941  4 Sheets—Sheet 3
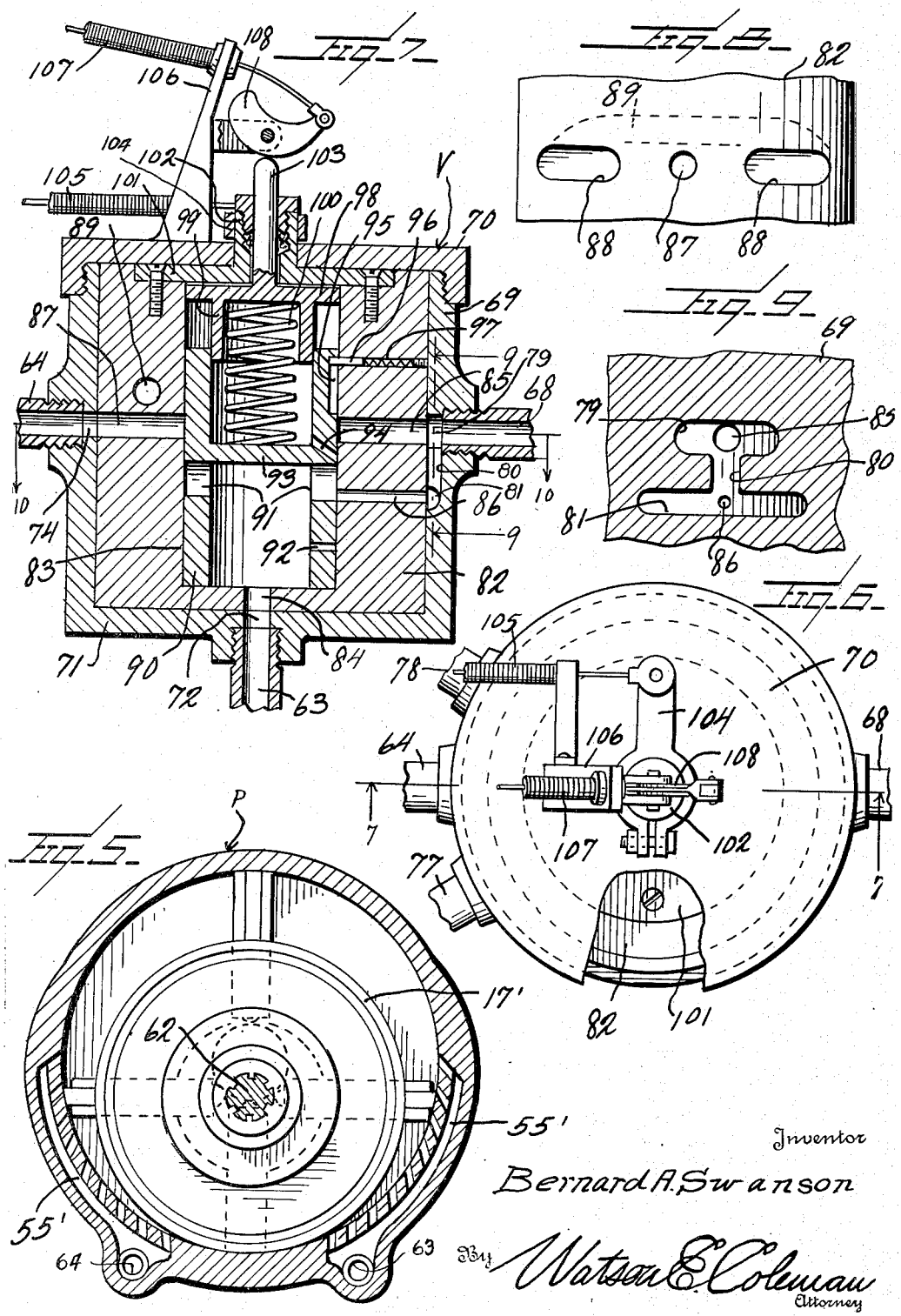
Inventor
Bernard A. Swanson
By Watson E. Coleman
Attorney July 10, 1945.  B. A. SWANSON  2,379,938
FLUID POWER TRANSMISSION MECHANISM
Filed Dec. 19, 1941  4 Sheets-Sheet 4
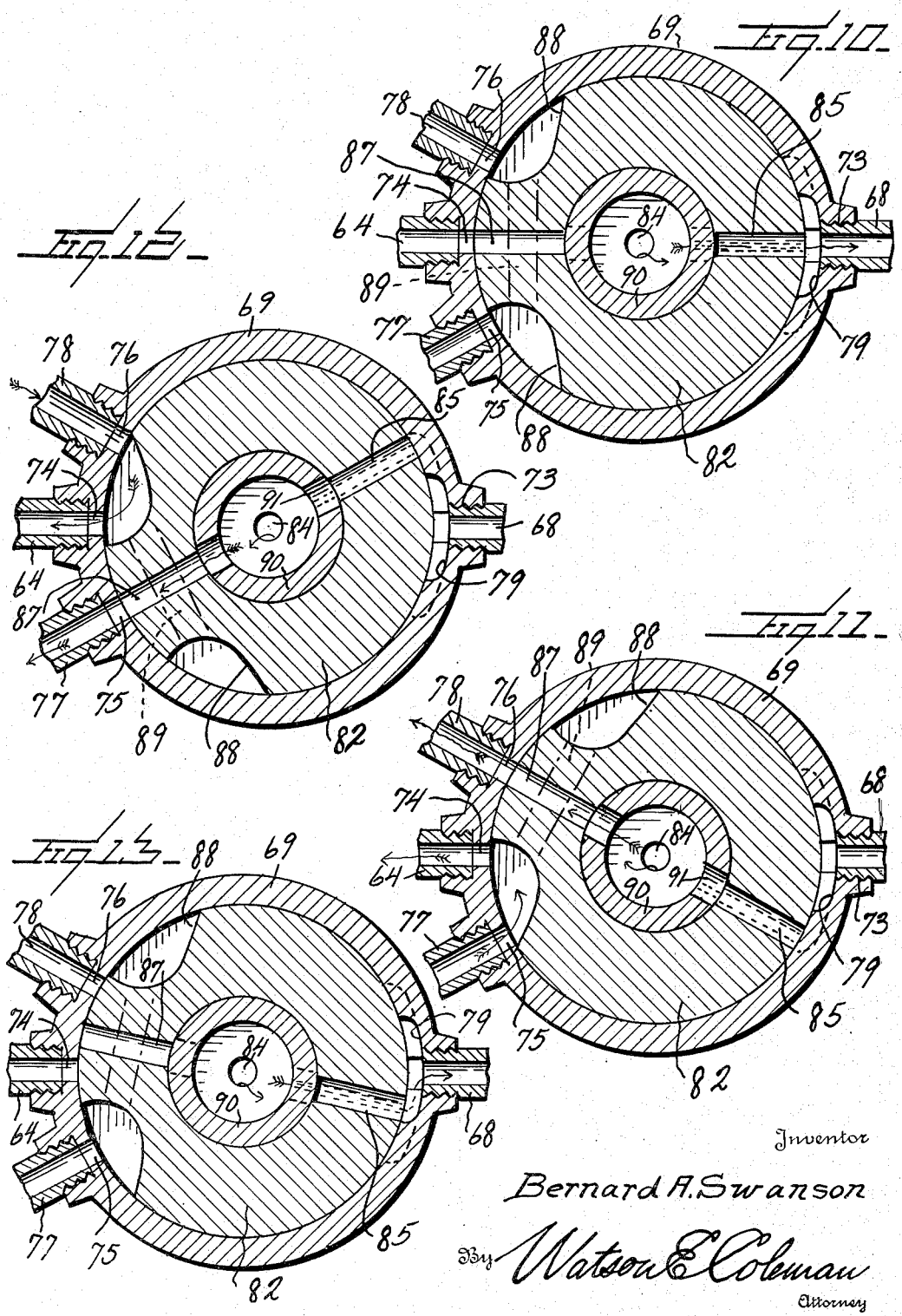
Inventor
Bernard A. Swanson
By Watson E. Coleman
Attorney Patented July 10, 1945

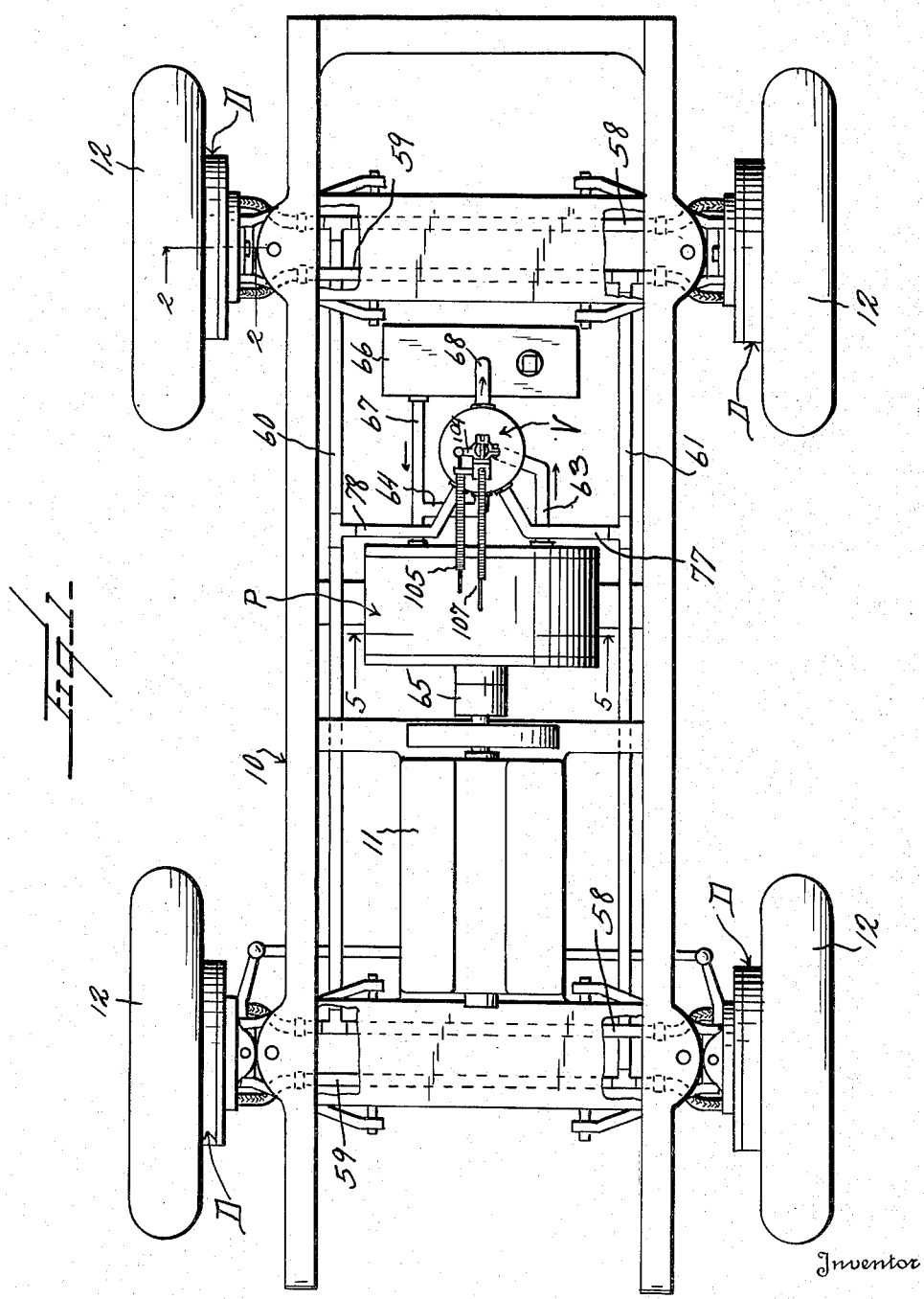

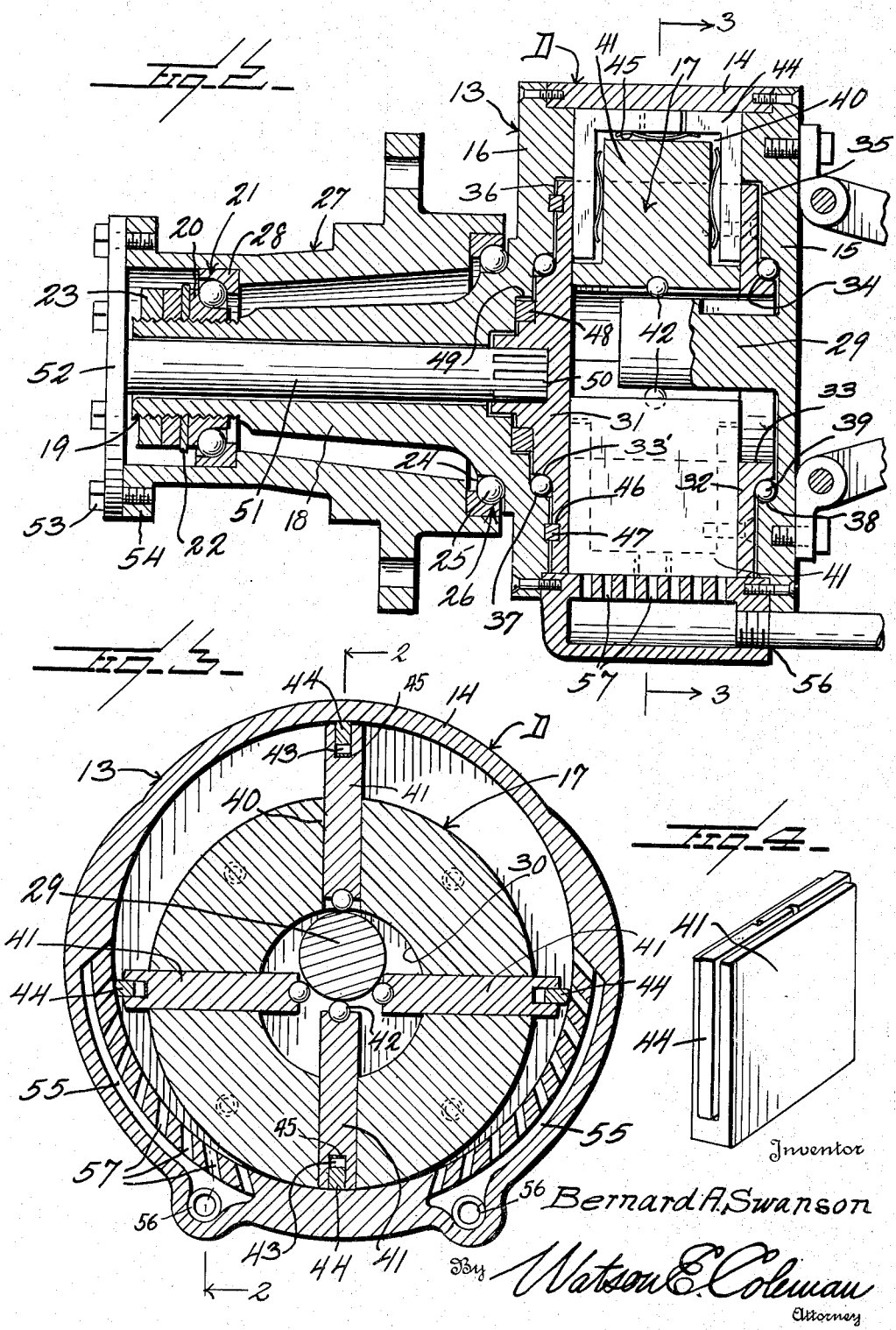

2,379,938

UNITED STATES PATENT OFFICE 2,379,938

FLUID POWER TRANSMISSION MECHANISM

Bernard August Swanson, Port Angeles, Wash.

Application December 19, 1941, Serial No. 423,681

6 Claims. (Cl. 60—53)

This invention relates generally to improvements in fluid or hydraulic drive systems, designed primarily for effecting the propulsion of a wheeled vehicle but adaptable to many other uses such as the control and actuation of rudders, elevators and ailerons of airplanes, the driving of propellers for boats or in any other capacity where power transmitting belts or gears might ordinarily be used.

A principal object of the present invention is to provide a fluid drive system having connected therein a fluid pump, a motor and a control valve, wherein said control valve when disposed in any one of several different operating positions may be employed to deliver power from the pump to the motor; to cut-out the motor from the system to permit the pump to be driven as an idling or free wheeling unit, and to completely shut-off communication between the pump and the motor unit and also prevent free rotary movement of the motor unit whereby to operate as a brake for the latter unit.

Another object of the invention is to provide in a system of the character stated a novel fluid flow control valve which is semi-automatic in that the development of an increased pressure of fluid in the system by the stepping up or the increasing of the speed of the pump, when the valve is set in certain prescribed positions, will cause the valve to automatically open to permit the fluid under pressure to move to and through the motor which it drives.

Still another object of the invention is to provide in a fluid drive system of the character stated, a novel control valve mechanism which is so constructed that circulation of the motive fluid through the valve between the pump and a fluid reservoir can be maintained at all times so that operation of the prime mover need not be stopped, regardless of the position of the control valve.

Still another object of the invention is to provide a novel mechanism which may be used in the system in the capacity of pump or fluid operated motor and which because of its novel construction operates at maximum efficiency either as a pump or as a motor according to its position in the system.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings—

Figure 1 is a view in top plan of a conventionally illustrated motor vehicle chassis showing in association therewith the fluid drive system of the present invention.

Figure 2 is a sectional view taken substantially on the line 2—2 of Figure 3 for the illustration of a wheel driving motor and the manner in which the same is coupled with the adjacent wheel.

Figure 3 is a sectional view on the line 3—3 of Figure 2.

Figure 4 is a view in perspective of one of the radial vanes used in the fluid motor or pump.

Figure 5 is a sectional view taken substantially on the line 5—5 of Figure 1.

Figure 6 is a view in top plan of the control valve, a portion thereof being broken away.

Figure 7 is a sectional view on the line 7—7 of Figure 6.

Figure 8 is a fragmentary detail showing in elevation a portion of the side of the valve cylinder.

Figure 9 is a sectional view taken on the line 9—9 of Figure 7.

Figure 10 is a horizontal section taken on the line 10—10 of Figure 7, showing the valve cylinder set in position for free running or free wheeling of the motor vehicle wheels.

Figure 11 is a horizontal section corresponding to Figure 10, but showing the valve cylinder set in position to deliver the motor propelling fluid to the wheel motors for turning the same in one direction.

Figure 12 is a horizontal section corresponding to Figure 10, but showing the valve cylinder set in position for delivering the fluid to the wheel motors for driving the wheels in the opposite direction.

Figure 13 is a horizontal section corresponding to Figure 10 and showing the control valve cylinder set in position to block the flow of fluid from the motor to both of the fluid lines which are connected with the wheel motors.

Referring now more particularly to the drawings the numeral 10 generally designates a motor vehicle chassis in association with which the present fluid drive system is illustrated and the prime mover or usual internal combustion engine is indicated at 11 while the supporting wheels are indicated by the numeral 12.

In carrying out the present invention each of the wheels 12 has disposed upon its inner side a fluid operated driving unit indicated generally by the character "D" which functions as a motor, this driving unit being shown in detail in Figures 2 and 3. As shown in these figures, the driving unit comprises a stator generally indicated by the numeral 13 which is in the form of a housing having the circular wall portion 14 and the inner and outer side wall plates 15 and 16 respectively. Within the housing stator is a rotor which is indicated generally by the numeral 17 and which will be hereinafter more specifically described.

Formed integrally with the outer side of the plate 16 is a tapered tubular axle 18, the outer end of which is reduced and screw threaded as indicated at 19 to have threaded thereon the inner ring 20 of a ball bearing unit indicated generally by the numeral 21, together with a locking washer and locking nuts 22 and 23 respectively which cooperate to maintain the wheel in place upon the axle. At its inner end the axle is formed to provide a race 24 for the reception of the bearing balls 25 of an inner bearing unit 26. This inner bearing unit is carried in the inner end of the hub 27 which forms a part of the wheel supported on the axle. On the outer end of the hub 27 there is fitted the outer race or ring 28 of the bearing 21, and thus it will be seen that the wheel is maintained in place upon the axle by the antifriction unit 21 and the locking nuts secured to the axle.

The inner wall or plate 15 of the stator or driving unit housing has formed integrally therewith the center post 29 which extends through the major portion of the internal width of the housing and the rotor body 17 which is in the form of an annulus and which is of a diameter materially less than the interior diameter of the housing, has this post 29 extended into the open center thereof which opening is indicated by the numeral 30.

The outer side of the rotor 17 presents a solid wall 31 while the inner side has secured thereto the removable wall plate 32 which has a central opening 33 concentric with the opening 30 of the body of the rotor. The remote faces of the walls 31 and 32 are formed to provide bearing shoulders 33' and 34 respectively and the opposing faces of the walls 16 and 15 of the stator are provided respectively with the concentrically related but eccentrically positioned recesses 36 and 35 in which the walls 31 and 32 position. The eccentric positioning of these recesses is with respect to the center of the interior of the housing or with respect to the center of the post 29 and as is clearly shown in Figure 2 these recesses are further shaped to provide bearing ball raceways 37 and 38 which cooperate with the races 33' and 34 respectively to receive between them the antifriction bearing balls 39. Thus the rotor is supported eccentrically within the housing and through a small extent of its circumference it contacts at its periphery with the inner face of the wall 14 of the housing as shown in Figure 3.

Formed radially through the body of the rotor 17 are guide slots 40 in each of which is slidably positioned a piston vane 41. The inner edge of each vane carries an anti-friction element 42 which bears against the post 29 while the outer edge and side edges of the vanes have formed therein grooves 43 in which is fitted a substantially U-shaped two part packing 44 which has interposed between each of the three sides thereof and the bottom of the groove in which said packing is located, a spring element 45 which constantly urges the outward movement of the adjacent portion of the packing for contact with the adjacent wall surface of the housing.

The opposing faces of the housing wall 16 and the rotor side wall or plate 31 have cooperating annular channels 46 therein to receive an annular packing 47 which encircles the adjacent bearing raceways 33'—37 and disposed within the circular area defined by these raceways is a second packing ring 48 which is interposed between cooperating shoulders 49 formed in the walls 16 and 31.

The center of the rotor wall 31 has formed therein a splined socket 50, this wall being of suitable thickness at its central part, as shown, to permit this socket to be formed relatively deeply. This splined socket 50 receives the slotted end of a stub shaft 51 which is locked by the intermeshing of the slots and splines with the rotor and which extends through the tubular axle 17 to the outer end thereof where it carries a plate 52 which is secured in a suitable manner to the outer end of the wheel hub, the means here shown comprising stud screws 53 which are threaded into suitable apertures formed in an annular flange 54 which is formed integral with the wheel hub.

The wall 14 is provided at each side of the area which is contacted by the periphery of the rotor 17, as is shown in Figure 3, with the circumferentially extending fluid chamber 55 and these chambers have opening into their adjacent ends, the fluid ports 56. The inner wall of each chamber 55 is provided with a series of slots 57 which are tangentially directed and by means of which fluid passes from the chamber to the interior of the housing and vice versa in accordance with the direction in which the wheels are being driven.

Corresponding ports 56 of oppositely positioned driving units D are connected by the transverse pipes 58 and each pair of pipes 58 has connected therebetween a manifold pipe 60 while each of the pairs of pipes 59 has connected therebetween a manifold pipe 61.

In the operation of the system one of the pipes 60—61 functions as a fluid delivery pipe and one of the ports 56 of each unit D functions as a fluid delivery port through which the fluid is introduced into the housing while the other port 56 and the other one of the pipes 60—61 functions as a fluid return port and it will be readily apparent upon reference to Figures 3 and 2 of the drawings that when fluid is introduced under pressure into one of the chambers 55 it will flow into the interior of the housing against a piston blade and effect the rotation or turning of the rotor 17 and, consequently, of the stub shaft 51 and wheel 12 which is coupled therewith. As the fluid is carried around in the housing between the rotor blades it will pass out through the other chamber 55 to return to the source from which it was delivered.

Figure 5 illustrates the fluid pump unit which is indicated generally by the character P and as will be readily apparent this pump unit is of exactly the same construction as the wheel driving units which have been described. In view of this it is deemed unnecessary to go into a detailed description of the pump unit as all of the parts are alike, the only difference between the pump unit and the driving unit being that the rotor which is indicated generally by the numeral 17' has connected therewith the drive shaft 62 which leads from the engine 11 so that the rotor instead of being driven by fluid entering the housing by way of one of the two chambers 55', is itself driven to force fluid out of the housing through one of these chambers to a valve delivery pipe 63, Figure 1, and receives fluid through or from the valve supply pipe 64. As shown in Figure 1, the pump unit P is placed behind the machine engine in the location of the usual transmission mechanism and it is preferred that this unit be approximately twice the size of the wheel driving units.

It is also proposed to interpose in the driving shaft 62 between the pump or unit P and the engine 11 a free wheeling unit or mechanism which is indicated generally by the numeral 65, in Figure 1, which will function to release back pressure on the pump when the vehicle is coasting but this feature forms no part of the present invention.

The numeral 66 designates a fluid supply reservoir for the system and this reservoir has an outlet pipe 67 which merges with the valve return pipe 64 to carry fluid into the pump, and a fluid return pipe which leads from the control valve which is about to be described, this return pipe being indicated by the numeral 68.

For controlling the flow of the fluid from the pump to the several driving units and back therefrom and also for permitting the fluid to be circulated between the driving units in by-passing relation with the motor and for checking all movement of the fluid so that the system will be locked and the turning of the wheels 12 will be prevented, there is provided the novel control valve indicated generally by the character V and illustrated in detail in Figures 6 to 13 inclusive.

The control valve comprises a casing 69 having a removable top or cover 70 which is designed to be firmly secured thereto to close the casing. The bottom wall 71 of the valve casing has an inlet port 72 with which the pump delivery pipe 63 is connected.

In the side wall of the valve casing there is a fluid outlet port 73 in which is connected an end of the fluid return pipe 68 which leads to the reservoir 66 and in addition to this port 73 the side wall of the valve casing has formed therethrough, preferably upon the side opposite from the port 73 and in the same plane, a central outlet port 74 with which is connected an end of the pump supply pipe 64 and two service ports 75 and 76 with one of which is connected an end of a pipe 77 leading to the manifold pipe 61 while the other service port has connected therewith an end of a pipe 78 leading to the manifold pipe 60, see Figure 1.

In forward and reverse operation of the motor vehicle the fluid will flow through the ports 75 and 76 in one direction for one form of operation or for forward movement and will flow through these ports in the opposite direction for the other operation or reverse movement of the machine. When the control valve V is set to effect forward driving of the machine then the port 76 becomes an outlet port and the fluid flows through the manifold 60 to the cross-over pipes 58 to operate the drive units D in a proper direction for moving the vehicle forwardly and the port 75 of the valve becomes an inlet or return flow port and the fluid flows from the cross-over pipes 59 into the manifold 61 and back to the valve unit and pump as indicated by arrows in Figure 11. Consequently, it will be seen that since Figure 11 shows the setting of the valve for forward driving of the vehicle, Figure 12 shows the setting of the valve for the reverse or rearward driving thereof.

The inner wall of the valve casing 69 has formed therein the short circumferentially extending channel 79 which communicates directly with the port 73 and, as is most clearly shown in Figure 9, this channel is connected by a short vertical passage 80 with a longer circumferentially extending by-pass channel 81, the purpose of which will be hereinafter described.

Snugly fitted in the casing 69 is a rotary valve cylinder 82 in which is formed a central axial passage or chamber 83 in the bottom of which is an inlet port 84 which is in constant communication with the port 72. Leading from the valve cylinder chamber 83 is a radial passage 85 which is in communication at one end with the casing wall passage 79 and below this passage 85 and parallel therewith is a small bleed passage 86 which extends from the chamber 83 outwardly in the plane of the by-pass 81 with which it communicates and with which it is at all times connected.

At the opposite side of the valve cylinder there is formed the radial passage 87 which alines transversely of the cylinder with the passage 85 and is adapted for selective connection with the ports 74, 75 and 76.

Upon opposite sides of the passage 87 which forms an outlet from the valve there are formed transfer pockets 88 between which is a crossover passage 89 which by-passes the passage 87. The circumferential extent of each pocket 88 is sufficient to establish a cross connection between the valve outlet port 74 and the ports 75 or 76, as shown in Figures 11 and 12.

Snugly disposed in the chamber 83 of the valve cylinder is an axially reciprocable shut-off sleeve 90 which is provided with the two diametrically opposite ports 91 and a by-pass port 92. Just above the ports 91 the sleeve is transversely divided by a partition wall 93 and from above this partition wall there extends through the sleeve wall a drain passage 94 which at times is in communication with the outlet passage 85 to permit fluid to drain from the upper part of the sleeve.

The outer surface or wall face of the sleeve is provided with a short vertically extending slot 95 in which is engaged a movement limiting pin 96 which is constantly urged inwardly from the valve cylinder in which it is carried by a spring 97. This pin prevents the sleeve from rotating during its reciprocatory movement and consequently when the sleeve rises, as it is forced to do under pressure of fluid entering through the port 84, the ports 91 will be brought into alinement with the passages 85 and 87. At this time the port 92 will be brought into alinement with the passage 86 but it will be seen, upon reference to Figure 7, that one of the ports 91 is constantly in communication with the passage 86 when the sleeve is in its lowermost position, and thus whether the sleeve be in its up position or in its down position there is always provided a through passage from the pipe 63 to the pipe 68. The reason for this will be hereinafter described.

The sleeve 90 is, of course, of a length materially less than the chamber in which it is located and disposed within the top of the chamber is a cap 98 which has an annular flange 99 which extends downwardly into the top of the sleeve 90. Interposed between this cap and the division wall 93 of the sleeve is a compression spring 100 which constantly urges the sleeve 90 downwardly or to its lowermost position.

The top of the chamber 83 is covered by a plate 101 from the center of which there extends upwardly through the cap 70, a tubular guide 102 and through this guide there is extended the vertical stem 103 which is integrally connected with the cap 98. The guide 102 has secured thereto the radially extending arm 104 with which is connected a suitable actuator such as a Bowden wire 105. By means of this actuator the valve cylinder 82 may be turned to any one of the positions shown in Figures 10 to 13 inclusive.

Adjacent the stem 102 is a supporting arm 106 which serves as a supporting means for a second actuator in the form of a Bowden wire 107 and also as a support for a pivoted cam 108 which is disposed above and in contact with the upper end of the stem 103 and which when oscillated in one direction by the attached Bowden wire forces the stem downwardly to compress the spring 100 and thereby hold the shut-off sleeve 90 with greater force in its downward position.

In the operation of the present system when the pump P is operated to have its rotor 17' turned by the engine or prime mover 11 fluid will be taken in through the pipe line 64 leading from the outlet port 74 of the control valve and will be forced out under pressure by the pump into the pipe 63 which leads to the inlet port 72 of the control valve. The valve shut-off sleeve will be in its lowermost position when the engine is not running or when the motor is idling or running at slow speed and consequently, regardless of the position occupied by the valve cylinder 82 in the casing no effect will be produced upon the wheel motors or driving units as the relatively slow moving fluid will merely pass by way of the by-pass passage 86 and passage 81 to the pipe 68 where it will be returned to the reservoir 66 and from which it will flow back to the motor by way of the pipe 67 which communicates with the pipe 64, as shown in Figure 1. However, if the speed of the pump P be increased so that the pressure introduced into the sleeve 90 is sufficient to raise this sleeve due to the incapacity of the passage 86 to carry the volume of fluid introduced, then the ports 91 will be brought into alinement with the passages 85 and 87.

If, upon this speeding up of the pump, the valve cylinder 82 be in the position shown in Figure 11 it will be seen that outflow of fluid from the passage 85 will be blocked because the passage has been moved out of communication with the circumferential wall passage 79 of the casing. Consequently the fluid can only flow through the radial outlet passage 87 which is now in communication with the port 76 which leads to the pipe 78 which connects with the manifold pipe 60. The fluid consequently will flow to the crossover pipes 58 and into the sides of the driving units D to rotate the wheels in a direction to move the vehicle forwardly. The fluid will return from these driving units by way of the manifold 61 and the pipe 77 which, as shown, is in communication, in Figure 11, with the adjacent pocket 88 and this pocket is in position to bridge the space between the ports 75 and 74 so that the returning fluid flows through the pipe 64 to the intake side of the pump.

With the valve cylinder in the position shown in Figure 11 to effect forward driving of the vehicle, if the pump speed be reduced so that there is insufficient pressure to lift the shut-off sleeve 90 or so that the spring 100 takes control to force the sleeve downwardly and thus close communication between the inlet ports 72—84 and the outflow passage 87, the valve cylinder 82 does not have to be returned to a position where the passage 85 is in communication with the port 73 because the outer end of the bleed or by-pass passage 86 will still be in communication with the by-pass passage or recess 81 in the wall of the casing and the slow moving fluid can flow back to the reservoir by way of the pipe 68.

From the foregoing it will be readily apparent that by reversing the position of the valve cylinder 82 to bring the outlet passage 87 thereof in communication with the port 75, as shown in Figure 12, a reversal of the flow of the fluid will be obtained to bring about reverse or backward movement of the vehicle.

When the control valve is in neutral position, as shown in Figure 10, then there are set up in effect two independent closed fluid circuits and whether the engine be run at high speed or be allowed to idle no fluid will be delivered to the wheel driving units because the fluid will enter through the pipe 63 and, if sufficient pressure is present to lift the sleeve 90, will be divided to flow out through the passages 85 and 87, passing by the first passage to the reservoir 66 and by the second passage through the pipe 64 to the intake side of the pump with which the exhaust pipe from the reservoir communicates thus the valve reservoir and pump will form one circuit. If the vehicle should be coasting on a down grade when the valve is in the position shown in Figure 10 then the driving units become pumps and force a circulation of the fluid in the units and in the pipes 60, 61, 77 and 78, through these pipes by moving the fluid from the outlet side of each of the units D through the cross-over pipes 59, manifold 61, pipe 77 and into the pocket 88 into which the port 75 opens, passing then through cross-over passage 89 to the opposite pocket 88 and out through the port 76 to the pipe 78 and by way of the manifold 60 and the cross-over pipes 58 back to the driving units.

When the valve cylinder 82 is moved or rotated to the position shown in Figure 13 it functions as a brake because movement of the fluid through the driving units in either direction is blocked since it cannot move across between the pipes 77 and 78. The outlet passage 77 is closed but the outlet passage 85 has not been moved far enough to shut-off its communication with the arcuate or circumferentially extending slot 79, therefore, if the fluid pressure is sufficient to raise the sleeve 90 the fluid will merely flow through the passage 85 to the pipe 68 and into the reservoir from which it will be drawn through the pipe 67 by the pump and recirculated in this manner. If the pressure is not sufficient to raise the sleeve 90 then the fluid will pass through a port 91 to the passage 86 and into the slot 81 to return to the reservoir by the pipe 68. In either case whether the sleeve 90 be raised or lowered some fluid will pass through the passage 86 because, as is shown in Figure 7, when the sleeve is down this passage opens into the sleeve through the adjacent port 91 and when it is up it still has communication with the interior of the sleeve through the sleeve port 92.

From the foregoing it will be readily apparent that there has been disclosed a system in which fluid is employed to take the place of driving shafts, gears such as are commonly employed in motor vehicle transmissions, brakes and other parts of a motor vehicle and by means of the mechanism shown such fluid can be easily controlled for imparting smooth motion in a forward or rearward direction to the vehicle and also for locking the vehicle wheels to prevent movement of the same.

While the present invention has been illustrated and described in association with the propelling of a wheeled vehicle it is believed that it will be readily apparent to those familiar with the art that this system may be readily used for driving the propellers of boats and for effecting desired movement of other mechanical structures where gears, driving belts or the like are at present used, as in the controlling of the rudders and elevators of airships and other movable parts thereof.

While there has not been illustrated means for controlling the flow of fluid through the pipes 60 and 61 and the cross-over pipes 58 and 59, it will be readily apparent that such control means in the shape of three way valves can be introduced into these pipe lines preferably at the couplings between the cross-over pipes and the longitudinal pipes so that the flow of fluid to any one of the driving units may be shut off if desired. By this means, if it should become necessary or desirable one or more of the driving units might be cut out of operation so that the full power might be delivered to the other unit or units.

What is claimed is:

1. In a fluid power transmission system, a fluid pump having an intake port and an outlet port, means for driving said pump, a driven unit having two ports designed to act alternatively as intake and outlet ports, a control valve having a casing and a shiftable element in the casing, said casing having an inlet port connected with one port of the pump and having an outlet port connected with the other port of the pump, said valve casing also having two service ports, two conduits leading respectively from the service ports to the driven unit ports, said valve element having a plurality of ports constructed and arranged to facilitate, by selective movement of the element, the selective connection of said conduits with the ports of the pump for directing movement of fluid in either of two directions through the conduits, and for the separation of connection between the conduits and the pump to establish the pump and valve in one closed system and the driven units and valve in a second closed system, a shiftable shut-off forming a part of said shiftable element, resilient means normally maintaining said shut-off in position to block flow of fluid through the valve to said driven units but yielding when the shiftable element is in certain operative positions to establish such flow upon development of a predetermined pressure in the valve, a fluid reservoir, means providing a by-pass bleed passage leading from the valve casing inlet to said reservoir, and a fluid-passage between the bleed passage and the pump inlet, said by-pass bleed passage being maintained open during shut-off and non-shut-off positions of said shiftable shut-off.

2. A control valve, comprising a casing having a circular side wall and top and bottom walls, an inlet port in the bottom wall, diametrically opposed, first and second outlet ports in the side wall, a service port at each side of the first outlet port, a valve cylinder body disposed in the casing and having a central axial chamber having a lower port aligning permanently with said inlet port, a pair of diametrically aligned passages in said cylinder adapted to directly couple the first and second outlet ports, the first passage of said pair of passages being selectively registerable with said service ports, said cylinder having a side wall pocket at each side of said first passage, said pockets being designed to bridge the space between one service port and the adjacent outlet port when the first passage registers with the service port, the inner wall of said casing having a circumferentially extending channel therein opening into the second outlet port and being at an elevation for register in intermediate positions of said cylinder with the second passage, said channel being of such length that the second passage is out of register therewith when the first passage is in register with either service port, means for rotating the cylinder to selected positions in the casing, the said inner wall of the casing being provided with a second circumferentially extending channel paralleling the first channel and having communication therewith, and said valve cylinder having a radially extending bleed passage leading from the chamber to the last mentioned channel.

3. A control valve, comprising a casing having a circular side wall and top and bottom walls, an inlet port in the bottom wall, diametrically opposed, first and second outlet ports in the side wall, a service port at each side of the first outlet port, a valve cylinder body disposed in the casing and having a central axial chamber having a lower port aligning permanently with said inlet port, a pair of diametrically aligned passages in said cylinder adapted to directly couple the first and second outlet ports, the first passage of said pair of passages being selectively registerable with said service ports, said cylinder having a side wall pocket at each side of said first passage, said pockets being designed to bridge the space between one service port and the adjacent outlet port when the first passage registers with the service port, the inner wall of said casing having a circumferentially extending channel therein opening into the second outlet port and being at an elevation for register in intermediate positions of said cylinder with the second passage, said channel being of such length that the second passage is out of register therewith when the first passage is in register with either service port, means for rotating the cylinder to selected positions in the casing, an axially shiftable shut-off sleeve disposed within the chamber, means normally urging said sleeve downwarly to the bottom of the chamber, said sleeve having diametrically opposite ports arranged to register with said first and second passages when the sleeve is moved upwardly to a predetermined position, a second circumferentially extending channel in the inner wall of the casing paralleling the first channel and having a greater length than the first channel, said channels being in communication, a bleed passage formed radially through the cylinder from the chamber and permanently registering with the second mentioned channel and also registering with one of said sleeve ports when the sleeve is in its lowermost position, and said sleeve having a bleed port leading from the interior thereof and adapted to register with said bleed passage when the sleeve is moved to its uppermost position.

4. A control valve, comprising a casing having a circular side wall and top and bottom walls, an inlet port in the bottom wall, diametrically opposed, first and second outlet ports in the side wall, a service port at each side of the first outlet port, a valve cylinder body disposed in the casing and having a central axial chamber having a lower port aligning permanently with said inlet port, a pair of diametrically aligned passages in said cylinder adapted to directly couple the first and second outlet ports, the first passage of said pair of passages being selectively registerable with said service ports, said cylinder having a side wall pocket at each side of said first passage, said pockets being designed to bridge the space between one service port and the adjacent outlet port when the first passage registers with the service port, the inner wall of said casing having a circumferentially extending channel therein opening into the second outlet port and being at an elevation for register in intermediate positions of said cylinder with the second passage, said channel being of such length that the second passage is out of register therewith when the first passage is in register with either service port, means for rotating the cylinder to selected positions in the casing, axially movable means in said central axial chamber for shutting off communication between said first and second passages, and means normally urging said axially movable means into shutting-off position but being yieldable under pressure introduced through said lower port for shifting to non-shutting position with respect to the passages.

5. A control valve, comprising a casing having a circular side wall and top and bottom walls, an inlet port in the bottom wall, diametrically opposed, first and second outlet ports in the side wall, a service port at each side of the first outlet port, a valve cylinder body disposed in the casing and having a central axial chamber having a lower port aligning permanently with said inlet port, a pair of diametrically aligned passages in said cylinder adapted to directly couple the first and second outlet ports, the first passage of said pair of passages being selectively registerable with said service ports, said cylinder having a side wall pocket at each side of said first passage, said pockets being designed to bridge the space between one service port and the adjacent outlet port when the first passage registers with the service port, the inner wall of said casing having a circumferentially extending channel therein opening into the second outlet port and being at an elevation for register in intermediate positions of said cylinder with the second passage, said channel being of such length that the second passage is out of register therewith when the first passage is in register with either service port, means for rotating the cylinder to selected positions in the casing, a cylindrical unit in said central axial chamber and having limited axial movement therein, said unit having a transverse passage adapted to establish communication between said first and second passages when the unit is moved in one direction to a predetermined position, said unit being movable to said predetermined position by pressure introduced against the unit through said inlet port, and spring means in the central axial chamber engaging and constantly urging the unit to move against said pressure.

6. A control valve, comprising a casing having a circular side wall and top and bottom walls, an inlet port in the bottom wall, diametrically opposed, first and second outlet ports in the side wall, a service port at each side of the first outlet port, a valve cylinder body disposed in the casing and having a central axial chamber having a lower port aligning permanently with said inlet port, a pair of diametrically aligned passages in said cylinder adapted to directly couple the first and second outlet ports, the first passage of said pair of passages being selectively registerable with said service ports, said cylinder having a side wall pocket at each side of said first passage, said pockets being designed to bridge the space between one service port and the adjacent outlet port when the first passage registers with the service port, the inner wall of said casing having a circumferentially extending channel therein opening into the second outlet port and being at an elevation for register in intermediate positions of said cylinder with the second passage, said channel being of such length that the second passage is out of register therewith when the first passage is in register with either service port, means for rotating the cylinder to selected positions in the casing, a cylindrical unit in said central axial chamber and having limited axial movement therein, said unit having a transverse passage adapted to establish communication between said first and second passages when the unit is moved in one direction to a predetermined position, said unit being movable to said predetermined position by pressure introduced against the unit through said inlet port, spring means in the central axial chamber engaging and constantly urging the unit to move against said pressure, a stem operatively coupled with said spring means and extending to the exterior of the casing, and a manually controlled means engaging said stem for increasing and decreasing the tension of said spring against the unit.

BERNARD AUGUST SWANSON.